(12) United States Patent
Koyama et al.

(10) Patent No.: US 7,236,846 B1
(45) Date of Patent: Jun. 26, 2007

(54) PRODUCT QUALITY INFORMATION CONTROL METHOD AND DISPLAY SYSTEM FOR SUCH INFORMATION

(75) Inventors: Shoichi Koyama, Sayama (JP); Yasunobu Fukushima, Sayama (JP); Chuji Nakagawa, Sayama (JP); Satoshi Sakamoto, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/270,953

(22) Filed: Mar. 17, 1999

(30) Foreign Application Priority Data

Mar. 18, 1998 (JP) ............................... 10-068986
Nov. 12, 1998 (JP) ............................... 10-322699

(51) Int. Cl.
*G06F 19/00* (2006.01)

(52) U.S. Cl. .................... 700/110; 700/180; 707/104.1
(58) Field of Classification Search ................ 700/95, 700/28, 109, 17, 214; 702/179, 180, 182, 702/185, 84
See application file for complete search history.

(56) References Cited

U.S. PATENT DOCUMENTS

| | | | | |
|---|---|---|---|---|
| 5,444,844 A | * | 8/1995 | Inoue et al. | 705/27 |
| 5,877,961 A | * | 3/1999 | Moore | 700/180 |
| 5,884,321 A | * | 3/1999 | Meffert | 707/104 |
| 6,006,171 A | * | 12/1999 | Vines et al. | 702/184 |
| 6,115,643 A | * | 9/2000 | Stine et al. | 700/110 |
| 6,144,956 A | * | 11/2000 | Yajima et al. | 707/3 |

* cited by examiner

*Primary Examiner*—Leo Picard
*Assistant Examiner*—Sheela Rao
(74) *Attorney, Agent, or Firm*—Hamre, Schumann, Mueller & Larson, P.C.

(57) ABSTRACT

A product quality information control method including the act of feeding repair information for making a repair based on imperfection information found during an inspection process of a product back to a manufacture control department. The repair information includes graphic and character information indicative of the contents of the repair made by a repair person. As a result, it becomes possible for the manufacture control department to accurately grasp an imperfection found by an inspection department and a temporary measure taken to cure the imperfection.

4 Claims, 12 Drawing Sheets

FIG. 8
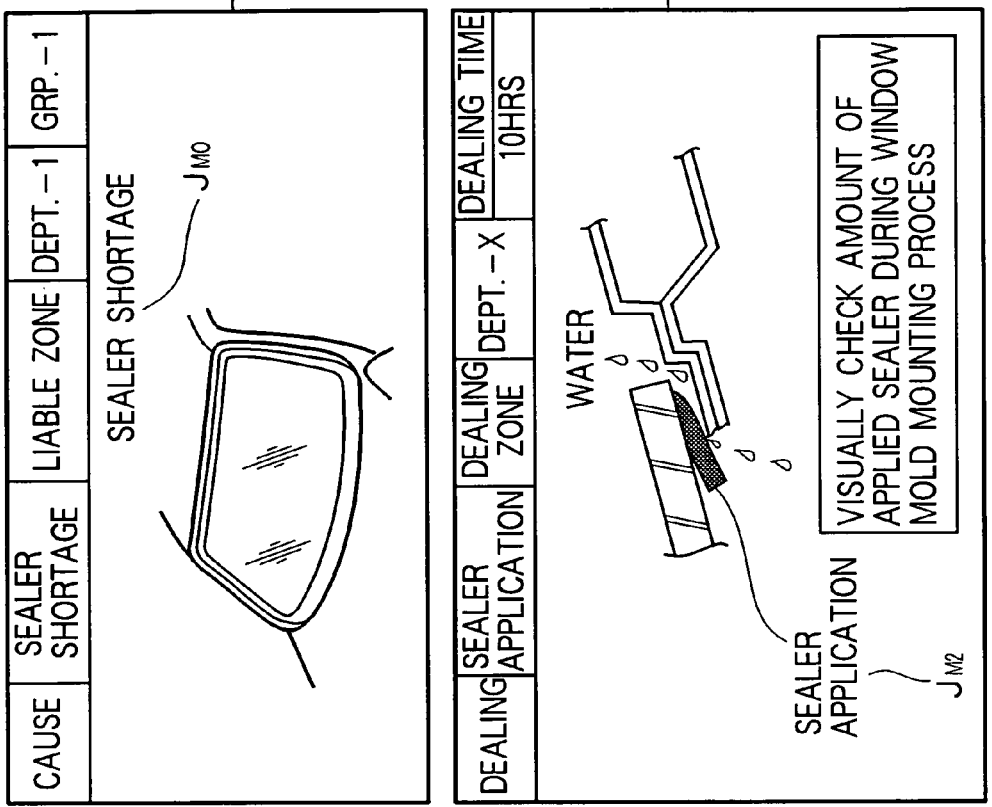
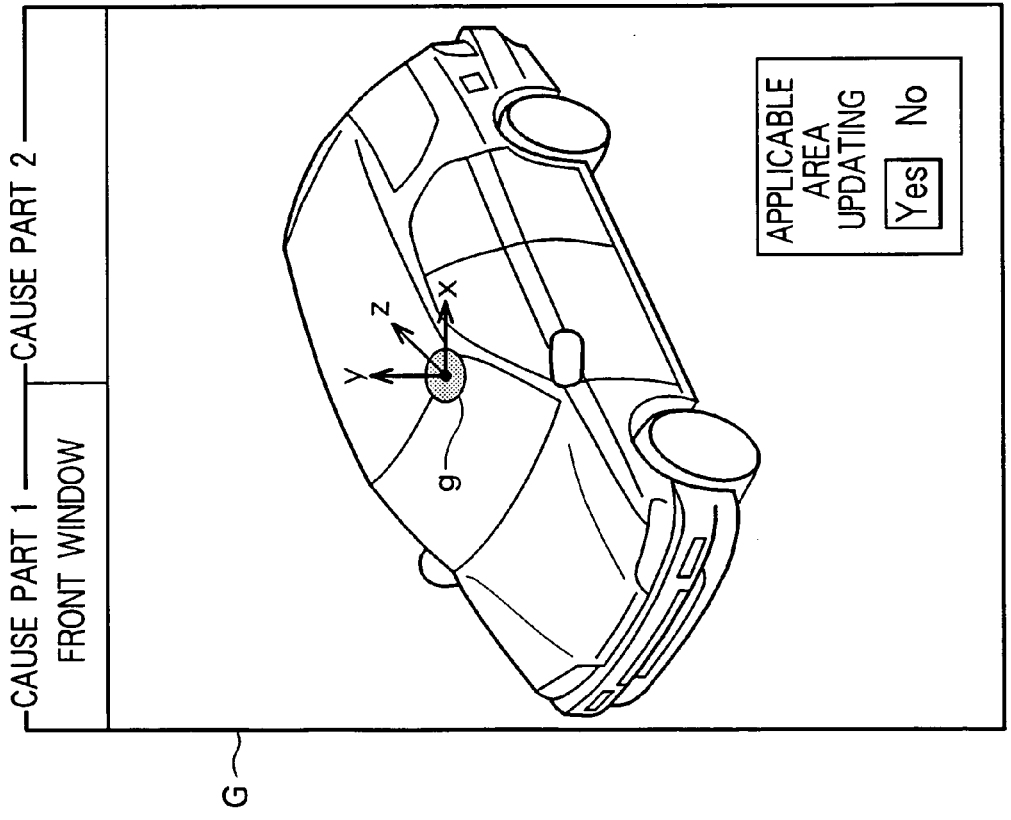

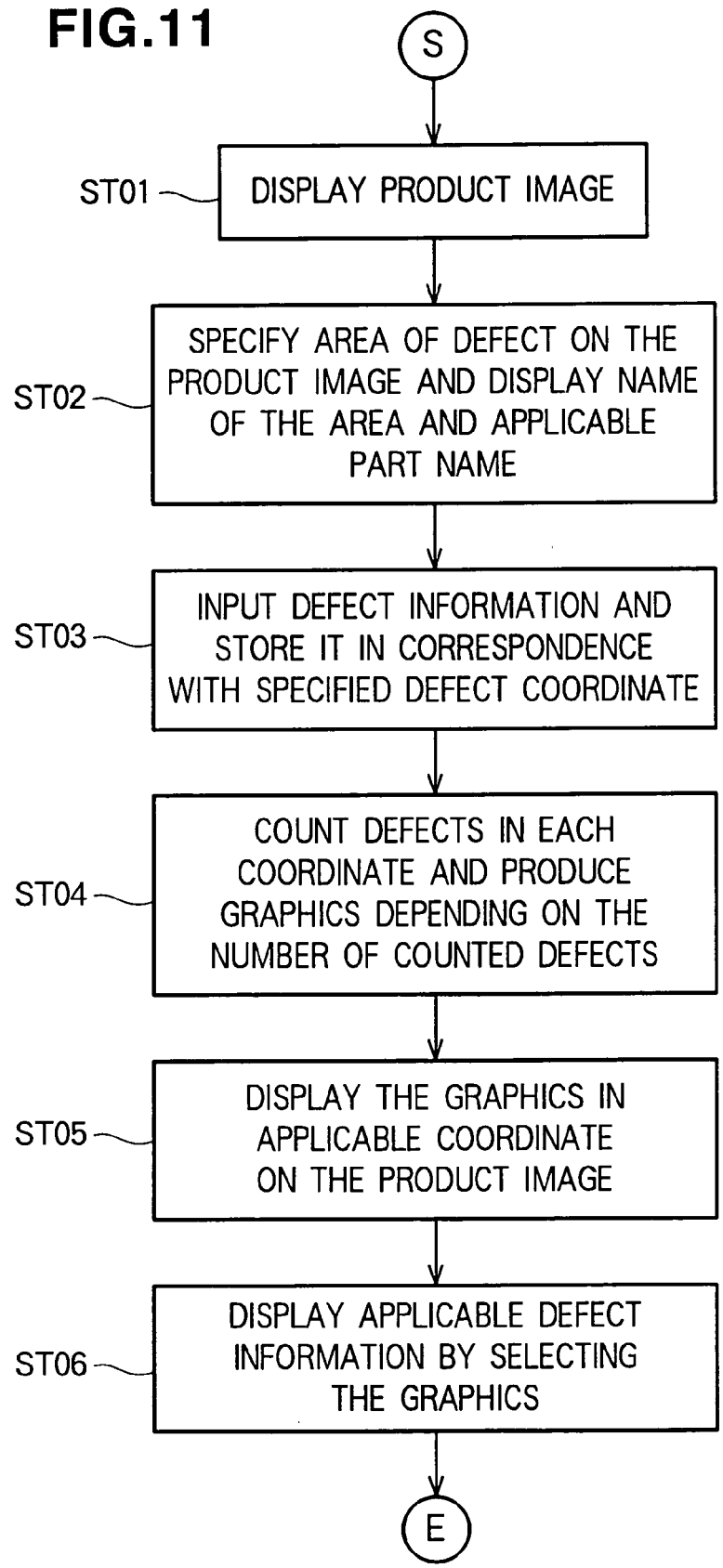

PRODUCT QUALITY INFORMATION CONTROL METHOD AND DISPLAY SYSTEM FOR SUCH INFORMATION

BACKGROUND OF THE INVENTION

1. Field of the Invention

This invention relates to a product quality information control method wherein information of an inspection department is fed back to a manufacture department to thereby stabilize the quality of resulting products. The present invention also relates to a display system for displaying such information.

2. Description of the Related Art

In a conventional product quality information control method, when an imperfection in a product is repaired, the repair position, repair contents and repair time are communicated to a control department for controlling the manufacturing line responsible for the occurrence of the imperfection. Then, the control department provides the manufacturing line with information relating to measures for preventing reoccurrence of such imperfection and records this, thereby stabilizing the quality of resulting products.

Automobiles, for example, are manufactured through a pressing process, a welding process, a painting process, a body assembly process and so forth. Manufacture control departments for controlling those processes perform their respective parts and assembly control operations.

Subsequently, an inspection department performs an outer appearance check, a function check and an adjustment operation in combination with the detection and repair of an imperfection, thereby maintaining the required product quality.

When an imperfection found by the inspection department is repaired, this is transmitted as repair information to an applicable manufacture control department where a measure against the imperfection is worked out. The measure information is reflected upon a responsible manufacturing line so that the imperfection is cured to thereby render the product quality stable. The repair and measure information is recorded at the manufacture control department for practical use in the succeeding manufacture of the products to keep the product quality stable.

The conventional product quality information control uses a database in which the geometric configurations of various areas or portions of an automobile and parts forming those areas are pre-stored. When an imperfection is found by the inspection department, an inspector takes a temporary measure to cure the imperfection. Thereafter, the inspector retrieves and selects from the database an imperfection position and related part or parts in an applicable area through a keyboard, inputs the state of the imperfection through the keyboard or the like, and specifies a manufacture control department controlling the imperfection position and related parts. Information on the imperfection is inputted into a personal computer or the like so that the imperfection position and related parts are communicated to the manufacture control department. Based on the communicated imperfection information, the manufacture control department works out an appropriate measure and inputs such measure information into the computer so that the measure can be put into practice.

However, it often becomes difficult for the manufacture control department to accurately grasp specifically what imperfection has occurred and what temporary measure has been taken, because the imperfection information from the inspector relates merely to the imperfection position and related parts and the state of the imperfection.

In certain instances, the inspector makes a sketch of the imperfection position and related parts, as well as the taken temporary measure. Normally, such sketch is delivered to the applicable manufacture control department after a day's inspection is over. As a result, many imperfections of the same nature occur in the resulting products. This provides the manufacture control department with many imperfection reports and temporary measures taken, thereby increasing man-hours of the inspector.

SUMMARY OF THE INVENTION

It is therefore an object of the present invention to provide a product quality information control method wherein accurate imperfection information is communicated efficiently from an inspection department to a responsible manufacture control department so that the latter can quickly take an appropriate measure to thereby avoid the occurrence of many imperfections of the same nature to be detected by the inspection department.

Another object of the present invention is to provide a system for displaying such product quality information.

According to a first aspect of the present invention, there is provided a product quality information control method for stabilizing the quality of products, which method comprises: a first step of inputting information of an imperfection found in the products during an inspection process of the products; a second step of making a repair based on the imperfection information and feeding repair information back to a responsible manufacture control department; and a third step of inputting measure information to be reflected upon the manufacture of the products based on the repair information. The repair information of the second step contains graphic and character information representative of contents of the repair.

In the above method, the repair information includes graphic and character information representative of the contents of the repair made by a repair person and is fed back to an applicable manufacture control department. As a result, the manufacture control department can accurately grasp the imperfection found by an inspection department and the temporary measure taken, thereby enabling early stabilization of the quality of the resulting products.

Preferably, the second step comprises: a first sub-step of selecting the imperfection information; a second sub-step of making a repair based on the imperfection information and inputting an imperfection cause and contents of the repair; a third sub-step of inputting produced graphic information and character information; and a fourth sub-step of feeding the repair information of the second and third sub-steps back to the applicable manufacture control department. By virtue of the third sub-step of inputting the graphic and character information, it becomes possible to accurately and quickly communicate the imperfection found by the inspection department and temporary measure taken, to the manufacture control department by way of a sketch or photograph.

The third step may include inputting pre- and post-remedy information in the form of graphics as measure information. This renders the measure against the imperfection obvious and enables provision of effective measure information to the manufacture control department and inspection department.

According to a second aspect of the present invention, there is provided a product quality information display system which comprises: a character information in putting device for inputting characters and numerals; an image position pointing device for pointing the position of an image on a screen; a storage device for storing character information from the character information inputting device and image position information from the image position pointing device and saving specific control information as a database; a graphic processor for counting the number of applicable pieces of the specific control information in each area stored in the storage device, per coordinate of the area or per event thereof, and producing graphics differing in size depending on the number of the counted applicable information pieces; and a display for displaying the produced graphics and the character and graphic information.

According to a third aspect of the present invention, there is provided a product quality information display method which comprises: a first step of pre-storing as a database a product image and names of parts in corresponding areas of the image in a storage device and displaying the product image on a display; a second step of specifying a specific area on the product image displayed on the display by an image position pointing device and displaying on the display names of parts applicable to a specified area; a third step of inputting specific control information by a character information inputting device and storing in the storage device the specific control information in correspondence with a coordinate of the specified area; a fourth step of counting the number of applicable imperfections in each specified coordinate and producing graphics differing in size depending on the counted numbers; a fifth step of displaying the produced graphics on an applicable coordinate of the product image on the display; and a sixth step of displaying applicable information on the display by selecting the displayed graphics by using the image position pointing device.

In the inventions in accordance with the second and third aspects, the specific control information may include inspection information of products.

In the inventions according to the second and third aspects, graphics are displayed which differ in size in correspondence with the numbers of applicable imperfections per coordinate or event. As a result, it becomes possible to instantly grasp contents of inspection information which is regarded as specific control information per coordinate or event, and hence to deal with the imperfection quickly. In addition, since the imperfection information is displayed in the form of graphics, a large amount of required information can be obtained at one time.

BRIEF DESCRIPTION OF THE DRAWINGS

Certain preferred embodiments of the present invention will hereinafter be described in detail, by way of example only, with reference to the accompanying drawings, in which:

FIG. 8 is a view of a screen showing repair information containing graphics and character information illustrative of the contents of a treatment done in FIG. 7;

FIG. 11 is a flowchart illustrating a product quality information displaying method employed in the display system of FIG. 4;

DETAILED DESCRIPTION OF THE PREFERRED EMBODIMENTS

The present invention will be described in more detail below in relation to the manufacture and inspection of automobiles (hereinafter called "products") as an exemplary production system.

Figure 1:
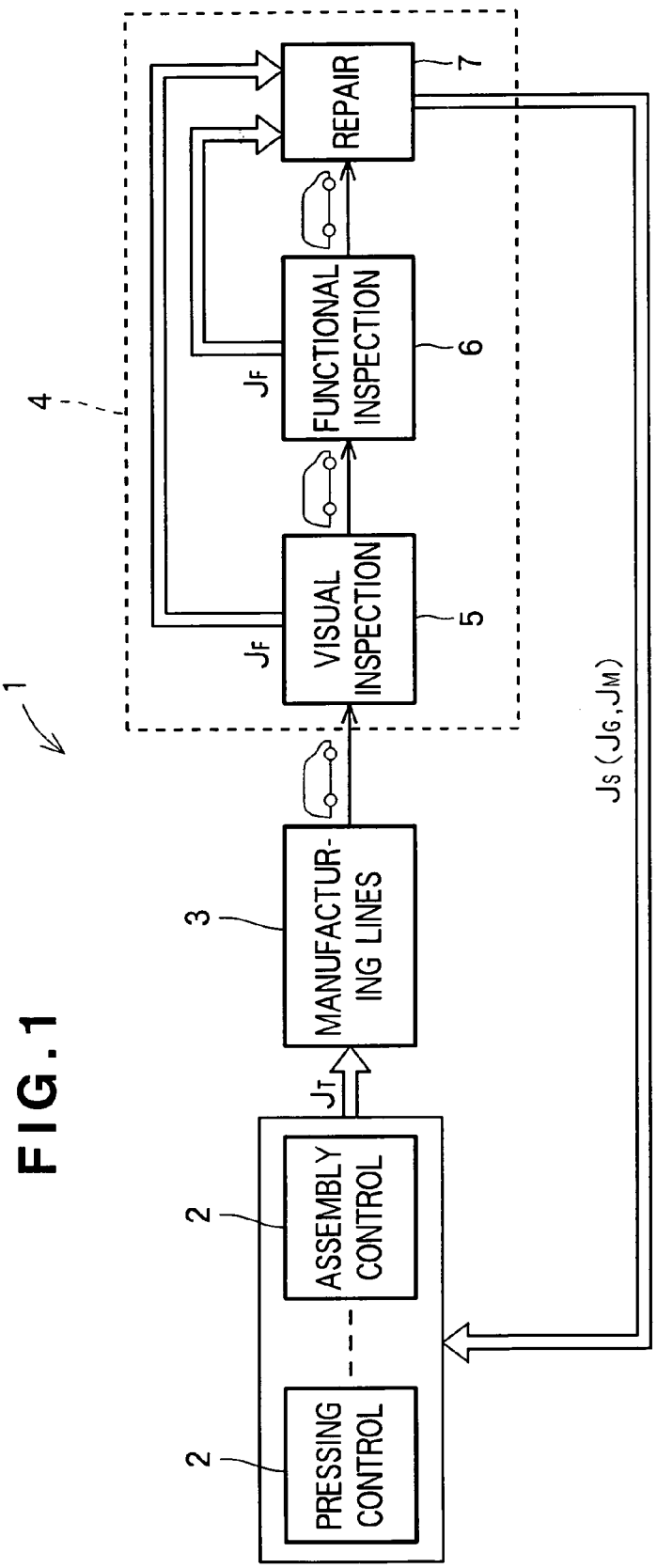
FIG. 1 is a block diagram illustrating a production system employing the product quality information control method according to the present invention.

As shown in FIG. 1, the production system 1 comprises a plurality of manufacture control departments 2, a plurality of manufacturing lines 3 corresponding to the respective control departments 2 and an inspection department 4. The production system 1 also includes a data input/output device such as a personal computer for effecting data input/output with respect to the departments 2, 4 and lines 3.

The manufacture control departments 2 control operations such as pressing, welding, painting and body assembly and have a database containing initial manufacture data relating to component and functional parts to be subjected to pressing, welding, painting and body assembly of a model fed along the manufacturing lines 3, and the order of assemblage of those parts.

Based on repair information $J_S$, fed back from the inspection department 4, concerning the repair of an imperfection in the product, an applicable manufacture control department 2 produces measure information $J_T$ and stores the same in its database as measure-added manufacture information. Thereafter, the control department 2 feeds the measure information to a corresponding manufacturing line 3 to bring the product nearer to perfection and to prevent repeated occurrence of the imperfection at the inspection department 4.

The manufacturing lines 3 comprise welding, painting and body assembly lines which correspond to the respective control departments 2 and assemble the product based on the initial manufacture data fed from the respective control departments 2. Based on the measure information $J_T$ fed from the control departments 2, the manufacturing lines 3 make an alteration to the manufacture of the product to thereby cure the imperfection in the products.

The inspection department 4 performs a quality check with respect to the product manufactured by the manufacturing lines 3. The inspection department carries out an outer appearance inspecting process 5, a functional inspection process 6 and a repair process 7.

In the outer appearance inspection process 5, the product is visually checked. When a visual imperfection is found in the product, an applicable area and part are readout from the database onto a screen and selected through a mouse or a keyboard and subsequently outputted as imperfection information $J_F$ as specific control information.

In the functional inspection process 6, the product is subjected to a function check. When an imperfection is found in the product, parts having the functional imperfection are read out from the database onto a screen. Then, the displayed parts are selected through a mouse or a keyboard and outputted as imperfection information $J_F$.

In the repair process 7, the imperfection information outputted from the outer appearance inspection process 5 and the functional inspection process 6 is inputted and selected. After the imperfect appearance and function of the product are repaired based on the imperfection information $J_F$, repair information $J_S$ including the positions and causes of the imperfection, remedies taken and the time required for the remedies are fed back to an applicable manufacture control department 2 which took care of the position incorporating the imperfection.

Again, in the repair process 7, a sketch and a memo of the imperfection position and repair contents are inputted into a personal computer through an input device such as an image scanner. Then, the position of the imperfection and parts and repair contents in the form of graphic information $J_G$ and character information $J_M$ are fed as repair information $J_S$ back to the manufacture control department 2 responsible for the manufacture of the position where the imperfection occurred. The imperfection information $J_F$ and repair information $J_S$ form inspection information.

Figure 2:
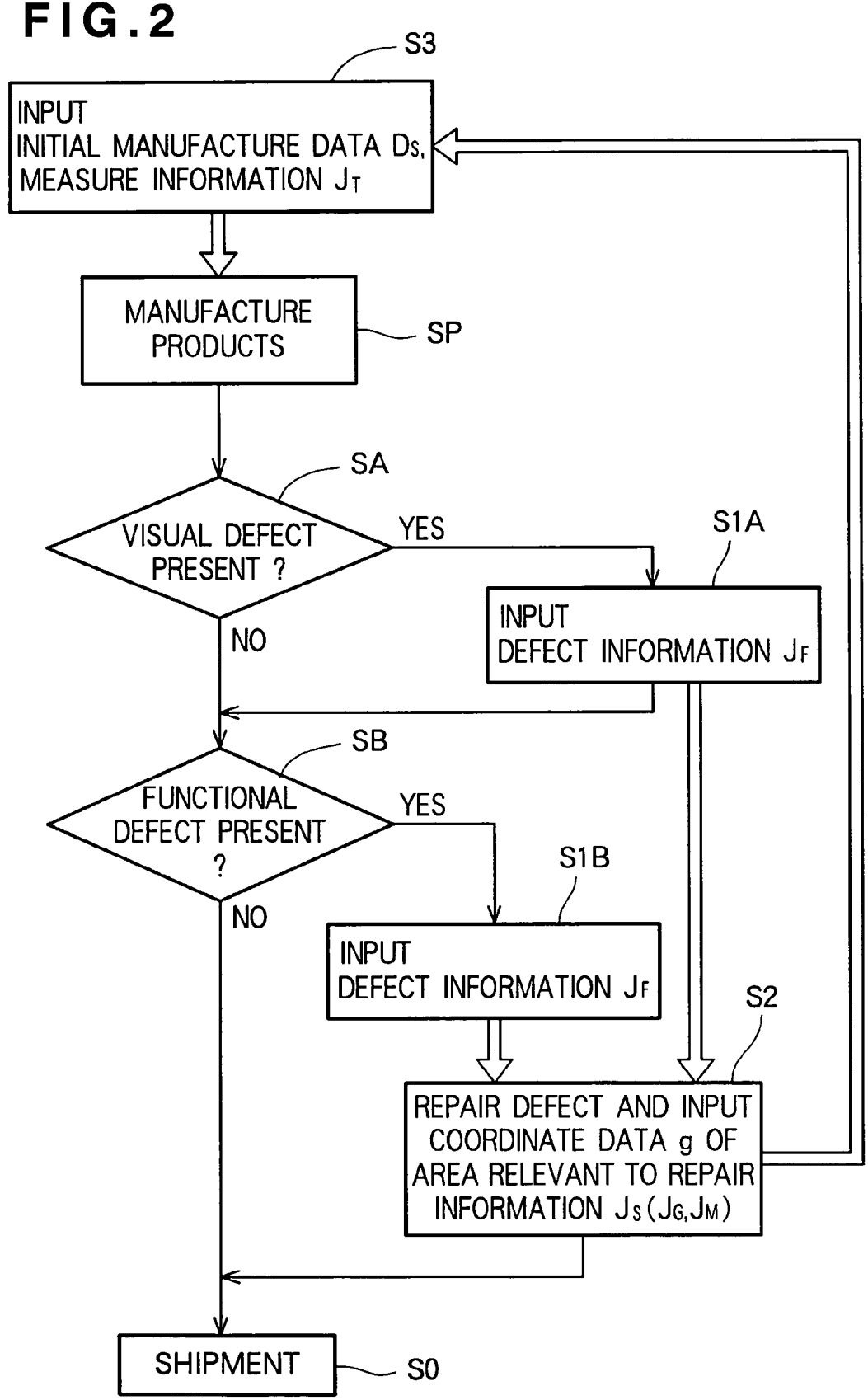
FIG. 2 is a flowchart of the product quality information control method used in the production system of FIG. 1.

In conjunction with FIG. 1, reference is now made to FIG. 2 showing a flowchart of the quality control from manufacture to shipment of the product. In FIG. 2, solid-lined arrows show an operation flow while dual-lined arrows indicate a flow of information.

The present product quality information control method comprises steps S1A, S1B for inputting imperfection information of the product, step S2 for making a repair based on the imperfection information and feeding repair information containing graphic and character information representative of the repair contents sketched by an inspector, back to a responsible one of the manufacture control departments, and step S3 for inputting measure information to be reflected upon the manufacture based on the repair information held by that manufacture control department 2.

At step S3 shown in FIG. 2, the initial manufacture data $D_S$ required as a database for the manufacture of the product is inputted into the manufacture control departments 2, or the data is pre-stored in those departments.

Then, at step SP, the production lines 3 manufacture the product based on the initial manufacture data DS inputted at step SP and supply the manufactured product to the visual inspection process 5. The flow now proceeds to step SA.

At step SA, a visual check is performed with respect to the product supplied from the production lines 3. When a visual imperfection is found, step S1A is followed. When no visual imperfection is found, the flow proceeds to step SB.

At step S1A, an area and parts including the visual imperfection found during the visual inspection process 5 are selected from the initial manufacture data DS and displayed on a screen. Then, they are inputted as imperfection information JF through a mouse or a keyboard. The flow then proceeds to step SB and step S2.

At step SB, a functional inspection is performed with respect to the product fed from the visual inspection process 5. When a functional imperfection is found, the flow proceeds to step SB1. When no malfunction is found, step S0 follows.

At step S1B, an area and parts related to the malfunction found during the functional inspection process 6 are selected from the initial manufacture data $D_S$ and displayed on a screen. They are then inputted as imperfection information $J_F$ through a mouse or a keyboard. The flow then proceeds to step S2.

At step S2, the visual imperfection information $J_F$ inputted at step S1A and the functional imperfection information $J_F$ inputted at step S1B are selected. This is followed by making the required repairs. Step S0 follows next.

Again, at step S2, the repair information $J_S$ containing the causes, remedies, required time, etc. of the imperfection information $J_F$ is selected and fed back to step S3. A repair person also makes a free-hand sketch of the imperfection position, causes and repair contents and a literal description of the latter and inputs them onto a display through an input device such as an image scanner. Thereafter, the repair person feeds graphic information $J_G$ corresponding to the sketch and character information $J_M$ corresponding to the literal description, as repair information $J_S$, back to a responsible one (e.g., pressing control department, body assembling control department) of the manufacture control departments 2.

At step S3, based on the repair information $J_S$ (containing the graphic information $J_G$ and character information $J_M$) fed from step S2, an urgent change is made to the manufacture of the presently flowing products. In addition, measure information $J_T$ incorporating remedies to cure the imperfection is supplied to step SP where the products are being manufactured.

The measure information $J_T$ of step S3 contains information indicative of the area of the imperfection and parts before and after they are imparted with a measure (remedied), which information is put into graphics form. This renders the measure against the imperfection obvious and enables provision of effective measure information to the manufacture and inspection departments.

At step S0, the imperfection-free products supplied from step SB and the imperfection-cured products supplied from step S2 are shipped.

Figure 3:
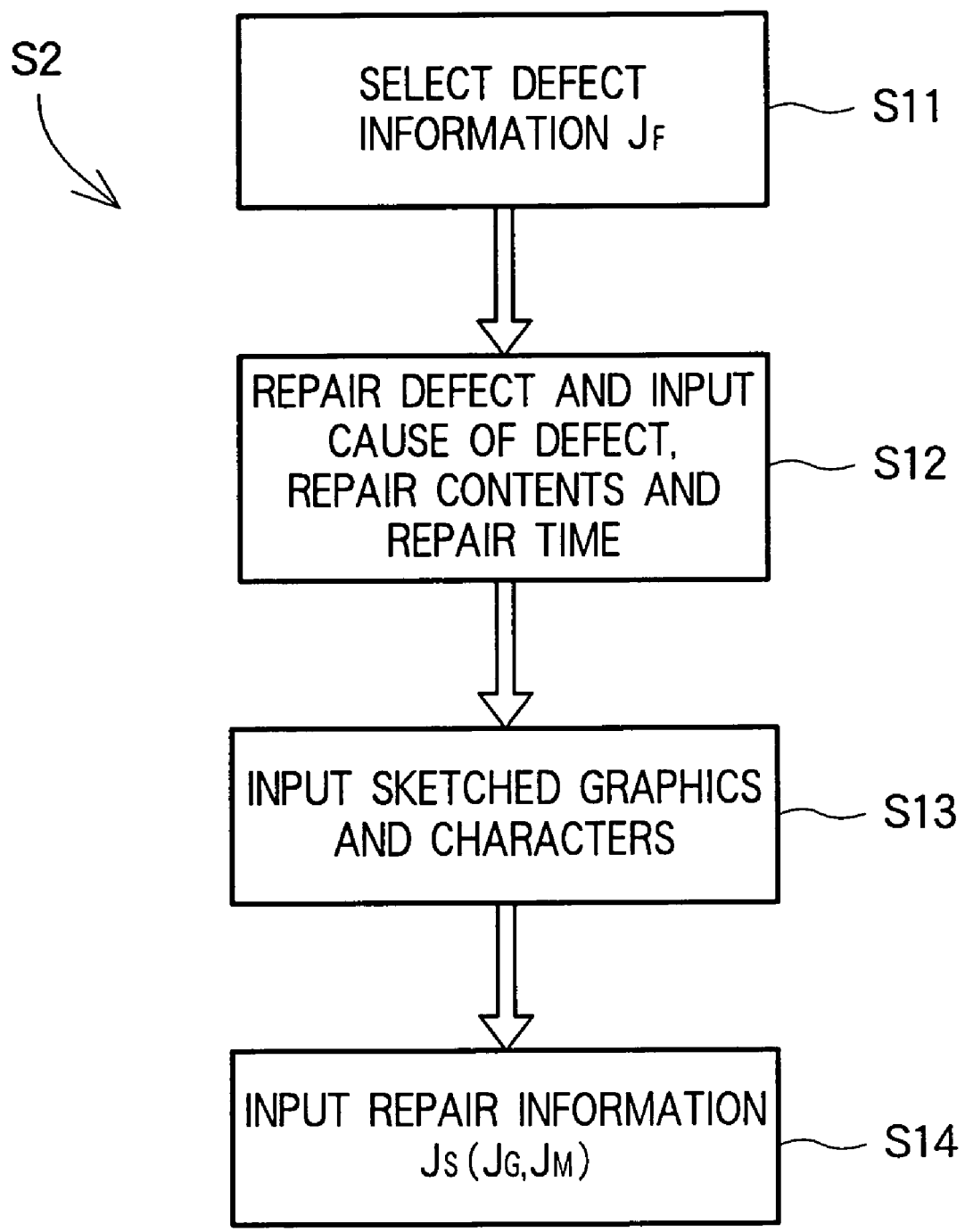
FIG. 3 is a flowchart showing sub-steps of a second step shown in FIG. 2.

Reference is next made to the flowchart of FIG. 3, showing sub-steps of step S2 in the flowchart of FIG. 2.

Step S2 comprises a first sub-step S11 where imperfection information is selected, a second sub-step S12 where a repair is made based on the imperfection information, pre-stored imperfection causes and repair contents are selected, and repair time or the like are inputted, a third sub-step S13 where sketched graphic and character information is inputted, and a fourth sub-stem S14 where the repair information of the second sub-step S12 and the third sub-step S13 is fed back to an applicable manufacture control department.

At the first sub-step S11, the imperfection information $J_F$ is selected, followed by displaying the contents of the visual or functional imperfection. The second sub-step S12 follows next.

At the second sub-step S12, repair is made to cure the visual or functional imperfection. Then, the cause and contents of the imperfection and time required for the repair are inputted into a relevant personal computer through a mouse or a keyboard. This continues with the third sub-step S13.

At the third sub-step S13, the graphics corresponding to the hand-sketched or photographed imperfection position and repair contents, and related descriptive characters are inputted into the computer through an image scanner or the like and then displayed on a screen. This is followed by the fourth sub-step S14.

Lastly, at the fourth sub-step S14, the information of the second sub-step S12 and the graphic and character information $J_G$, $J_M$ of the third sub-step S13 are fed back to a responsible one of the manufacture control departments 2.

As just explained, the product quality information control method according to the present invention includes, in its step S2 shown in FIG. 2, the third sub-step S13 for inputting the sketched or photographed graphics and character information. As a result, it becomes possible to accurately and quickly transmit to the responsible manufacture control department 2 the imperfection found by the inspection department and a temporary measure against the imperfection.

Figure 4:
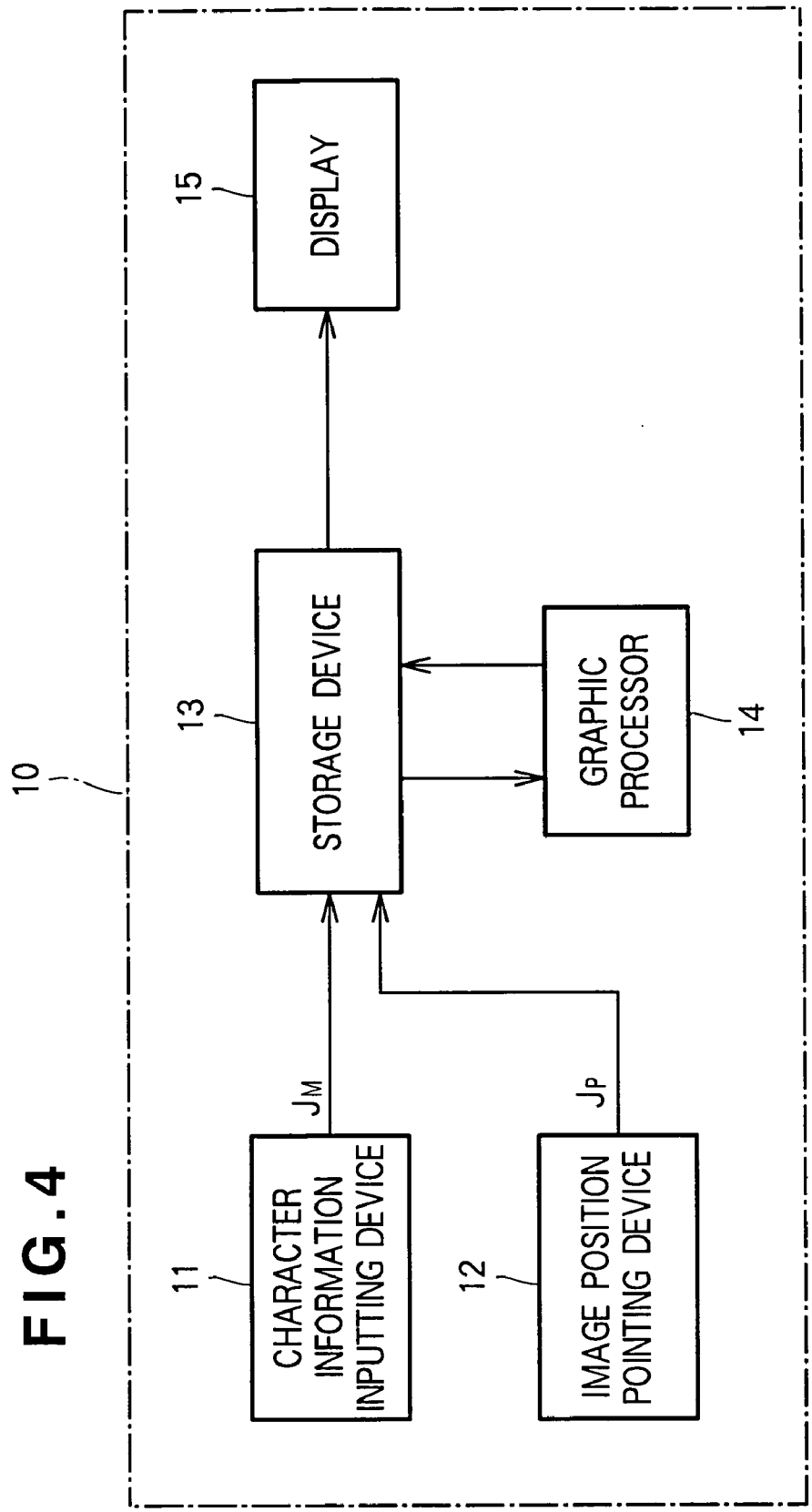
FIG. 4 is a block diagram illustrating a display system used in conjunction with the product quality information control method.

Reference is next made to FIG. 4 showing a product quality information display system in block diagram.

As shown in FIG. 4, the product quality information display system 10 comprises a character information inputting device 11, an image position pointing device 12, a storage device or memory 13, a graphic processor 14, and a display 15.

The character information inputting device 11 comprises a keyboard or the like for inputting characters and numbers. The image position pointing device 12 comprises a mouse or the like for pointing the position of an image on a screen. The memory 13 stores character information $J_M$ inputted from the character information inputting device 11 and image position information JP pointed by the image position pointing device 12 and saves the imperfection information $J_F$ (see FIG. 1) as a database. The graphic processor 14 counts the number of applicable imperfections, stored in the storage device 13, per coordinate of imperfection positions or per event of imperfections and produces graphics which vary in size with the size of the numbers of counted applicable imperfections. The display 15 displays the character information $J_M$ and graphics information $J_G$ (see FIG. 2).

Figure 5:
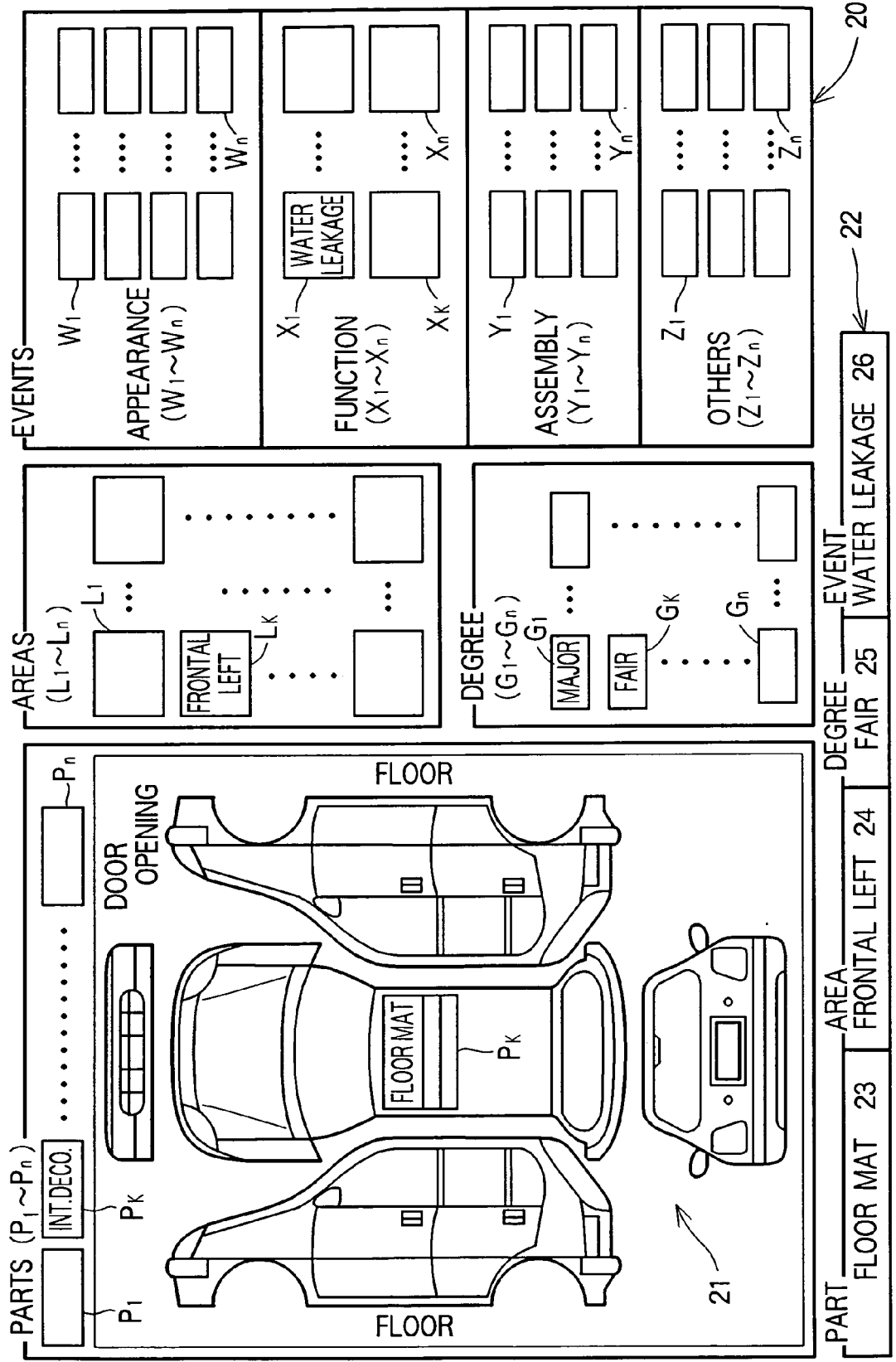
FIG. 5 is a view of a screen showing example imperfection information.

FIG. 5 illustrates an example picture displayed on an input screen of the product quality information display system.

As shown in FIG. 5, a product quality input screen 20 includes a product image display section 21, registered part name display sections $P_1$–$P_n$, registered area name display sections $L_1$–$L_n$, degree name selecting keys $G_1$–$G_n$, external appearance selecting keys $W_1$–$W_n$, function selecting keys $X_1$–$X_n$, assembly selecting keys $Y_1$–$Y_n$, others selecting keys $Z_1$–$Z_n$, and an inputted information display section 22.

The product image display section 21 displays a product picture pre-stored in the database so that the position of occurrence of an imperfection can be specified. The registered part name display sections $P_1$–$P_n$ display names of parts of the product, which are pre-stored in the database. The registered area name display sections $L_1$–$L_n$ display an area incorporating imperfect parts. The degree name selecting keys $G_1$–$G_n$ select imperfection degrees pre-stored in the database. The external appearance selecting keys $W_1$–$W_n$ select visual imperfections such as dents in a body, scratches, distortions and uneven paintings from among events of imperfection (e.g., facts, phenomena) pre-stored in the database. The function selecting keys $X_1$–$X_n$ select functional imperfections in various parts. The assembly selecting keys $Y_1$–$Y_n$ select imperfections in the state of assemblage of parts or a vehicle body. The other selecting keys $Z_1$–$Z_n$ select imperfections other than those included in the imperfection events. The inputted information display section 22 displays imperfection information selected and inputted, as described above. That is, the inputted information display section 22 comprises an inputted part name display section 23, an inputted area name display section 24, an imperfection degree name display section 25 and an event display section 26.

On the example screen being described, there is displayed an imperfection of "water leakage(=event $X_K$)" of "fair degree(=degree $G_K$)" at a "frontal left portion(area $L_K$)" of a "floor mat(=part $P_K$)".

In the above description, the term "keys" represents those portions which can effect specification on the product quality information input screen 20 by the image position pointing device 12.

The other selecting keys $Z_1$–$Z_n$ in the events may be changed to a character information display section for displaying the characters and numbers inputted from the character information inputting device 11 shown in FIG. 4.

Figure 6:
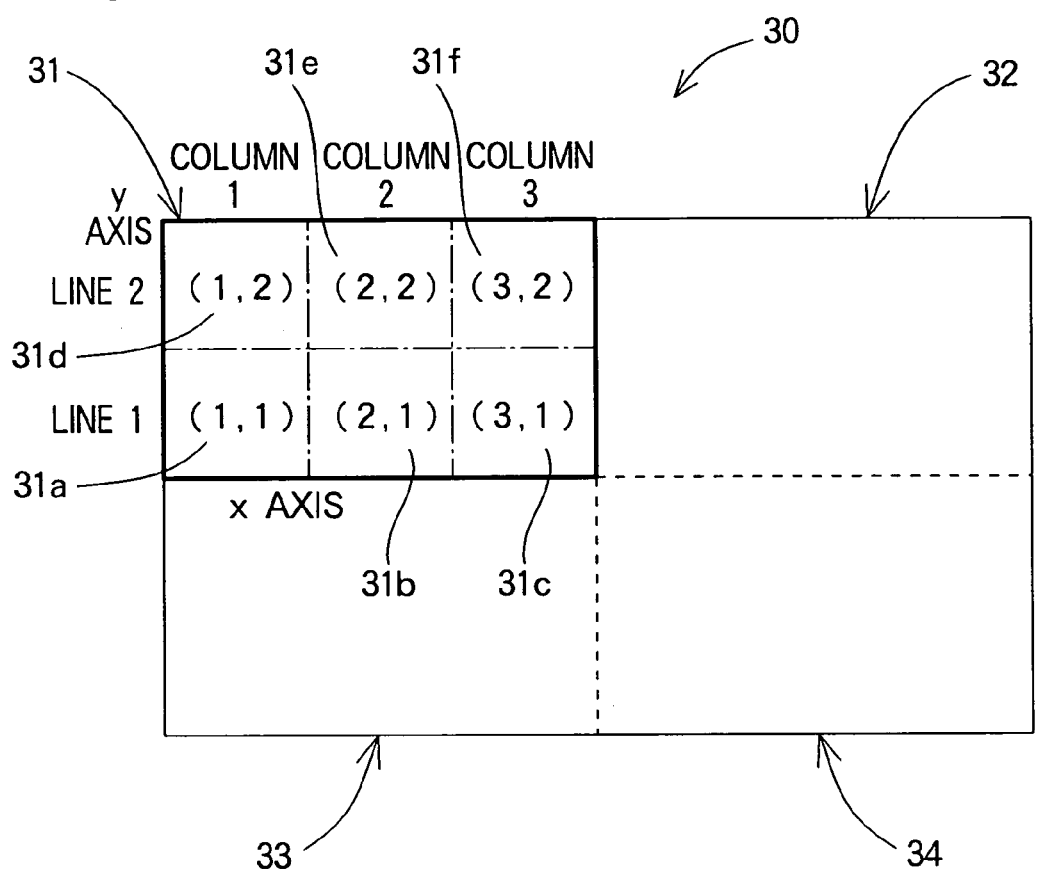
FIG. 6 is an enlarged view showing a component part of the product image on the screen of FIG. 5.

FIG. 6 is an enlarged view showing a part, specifically a floor mat, of the product image of FIG. 5.

Part 30 is divided into four areas 31, 32, 33 and 34, each of which in turn is divided into six blocks. The area 31, for example, is divided into six blocks 31a, 31b, 31c, 31d, 31e and 31f.

The area 31 has two lines and three columns. From the bottom these lines are called a first line and a second line. From the left to the right, the columns are called a first column, a second column and a third column. Thus, each block can be represented by (column, line). For example, the block 31a is represented by (1, 1). Similarly, the block 31b is (2, 1); block 31c (3, 1); block 31d (1, 2); block 31e (2, 2); and block 31f (3, 2).

Assume that a horizontal direction of the area 31 is an X axis, that a vertical direction of the area is a Y axis, and that each block forms X-Y coordinates. Then, (column, line) each block can be represented by X-Y coordinates. That is, the respective X-Y coordinates of the blocks 31a, 31b, 31c, 31d, 31e and 31f are (1, 1), (2, 1), (3, 1), (1, 2), (2, 2) and (3, 2).

Figure 7:
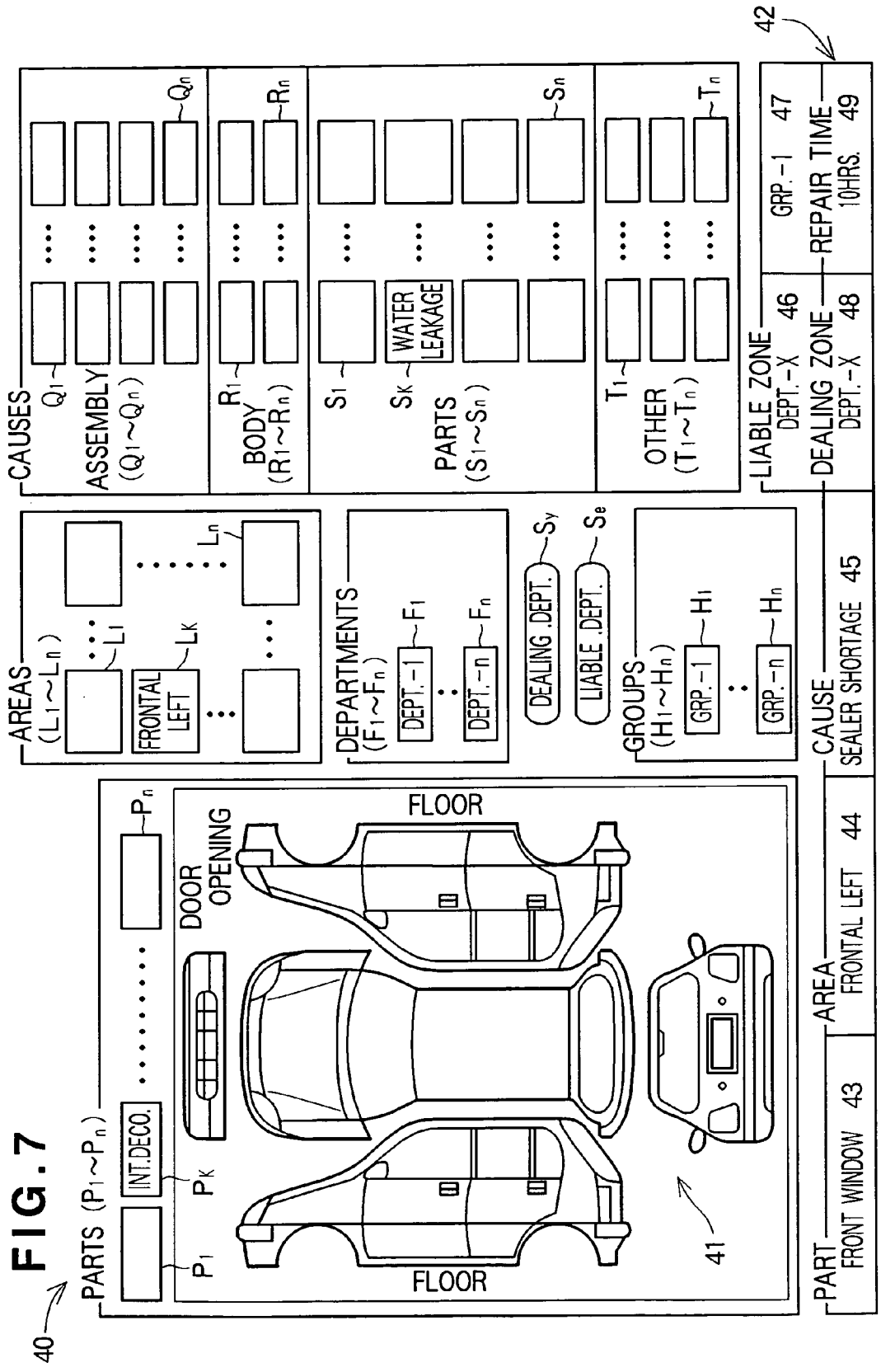
FIG. 7 is a view of a screen showing example repair information.

Reference is next made to FIG. 7 illustrating an example input screen of repair information of the product quality information control method. Display sections identical to those of the product quality information input screen 20 described in relation to FIG. 5 will be designated by same reference numerals and their description will be omitted.

Repair information input screen 40 includes a product picture or image 41 pre-stored in the database for specifying the position of repair of an imperfection, registered part name displaying sections $P_1$–$P_n$ and registered area name displaying sections $L_1$–$L_n$, department selecting keys $F_1$–$F_n$ for selecting departments to make repairs, group selecting keys $H_1$–$H_n$ for selecting particular groups from among the departments, a dealing department key Sy and a liable department key Se for selecting between a dealing department and a liable department, assembly selecting keys $Q_1$–$Q_n$ for selecting imperfection causes concerning parts or body assembly from among pre-stored imperfection causes, body selecting keys $R_1$–$R_n$ for selecting causes of imperfections concerning a body, part selecting keys $S_1$–$S_n$ for selecting causes of imperfections concerning parts, other selecting keys $T_1$–$T_n$ for selecting other imperfection causes, and a repair information display section 42.

The repair information display section 42 includes an inputted part displaying section 43, an inputted area displaying section 44, a cause displaying section 45, a department displaying section 46 and a group displaying section 47 in a liable zone, a department displaying section 48 in a dealing zone, and a repair time displaying section 49. On the selected example screen being described, there are shown a front window ($P_K$) as a part, frontal left ($L_K$) as an area, sealer shortage ($S_K$) as a cause, department -X as a remedy zone, and 10 hours as a repair time.

In place of the other keys $T_1$–$T_n$ in the box of causes, a character information displaying section may be provided for displaying characters and numerals inputted from the character information inputting device 11 (see FIG. 4).

FIG. 8 shows an example picture of repair information containing graphic and character information corresponding to the contents of the remedy made or measure taken in FIG. 7.

As shown in FIG. 8, a screen frame $I_O$ on the side of a liable zone responsible for the imperfection shows information in the form of graphics and characters representative of the causes and repair contents of the imperfection handsketched and/or photographed by a repair person and then read into the computer via a scanner and/or a digital camera. At an upper part, the screen frame $I_O$ includes the cause of the imperfection, as well as the department and group in the liable zone.

Screen frame $I_R$ on the side of a dealing zone for remedying the imperfection shows, on an enlarged scale, an image of the part which caused the imperfection. At an upper part, it indicates sealer shortage $J_{MO}$ as a cause of the imperfection, sealer application $J_{M2}$ as a remedy against the imperfection, the dealing zone and required dealing time.

Graphic screen frame G for specifying the imperfection position shows an outer appearance image of the product, automobile, along with the position of the imperfection. The graphic screen frame G is connected to a computer graphics function not shown. By clicking an applicable area with a mouse, the screen frame G displays position data g (x, y, z) representing a target area by x, y, z coordinates intersecting with each other. The data g will be used in the aggregation of the imperfection information $J_F$ (see FIG. 1) discussed below.

The information thus updated with the actual imperfection and remedy or countermeasure taken is fed as repair information $J_S$ in the form of graphics $J_G$ and characters $J_M$, as shown in FIG. 1, back to a manufacture control department 2 in the liable zone.

Figure 9:
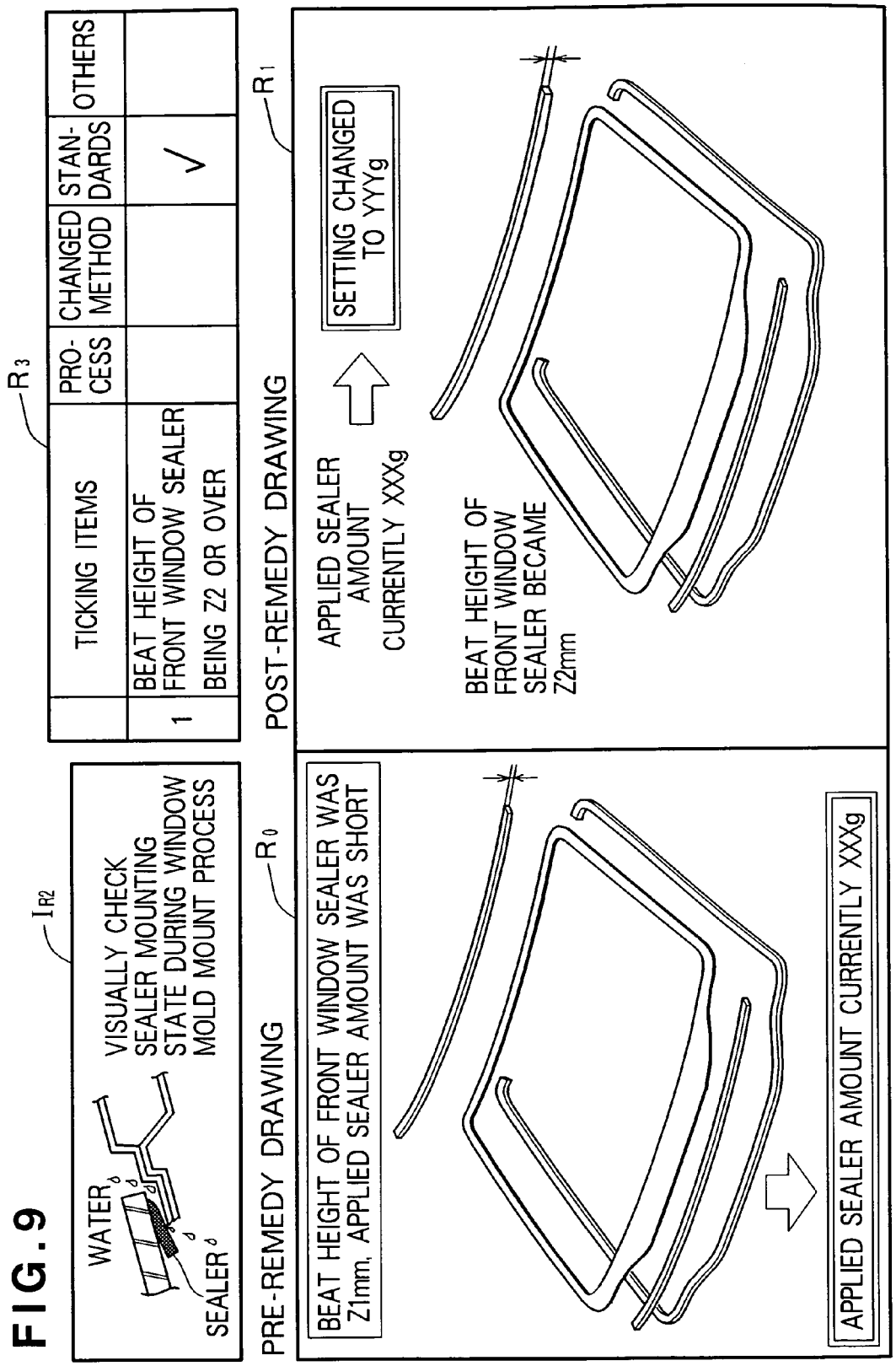
FIG. 9 is a view of a screen showing measure information to be communicated to a manufacture control department.

FIG. 9 is an example screen of measure information to be instructed to a responsible manufacture control department.

Shown in this figure are a screen frame $I_{R2}$ displaying the graphics image and character information as the repair information $J_S$ (see FIG. 1) of the screen frame $I_R$ (see FIG. 8) fed back from the repair process 7 (see FIG. 1), a screen frame $R_0$ displaying graphics and character information before curing (remedying) the imperfection, a screen frame $R_1$ displaying a drawing and tick items after curing or remedying, and tick item display boxes $R_3$.

Discussion will be made next as to a method of displaying imperfection information on the product.

Turning back to FIG. 5, an area in which an imperfection has occurred is specified on the displayed product image 21 by the image position pointing device 12 (see FIG. 4). Then, the area is explicitly indicated by flashing applicable area and part names among the displayed area and part names, or by reversing the background and character colors of the screen to thereby show the area in reverse video.

Next, events and degrees of imperfection are inputted as imperfection information. Specifically, the events are inputted by selecting applicable keys from among the external appearance selecting keys $W_1$–$W_n$, function selecting keys $X_1$–$X_n$, assembly selecting keys Y1–Yn and other selecting keys $Z_1$–$Z_n$. The degrees of imperfection are inputted by selecting applicable keys from among the degree name selecting keys $G_1$–$G_n$. The inputted applicable part name, applicable area name, events and degrees of imperfection are stored as a group in the storage device 13 (see FIG. 4) and saved in the database.

Figure 10A:
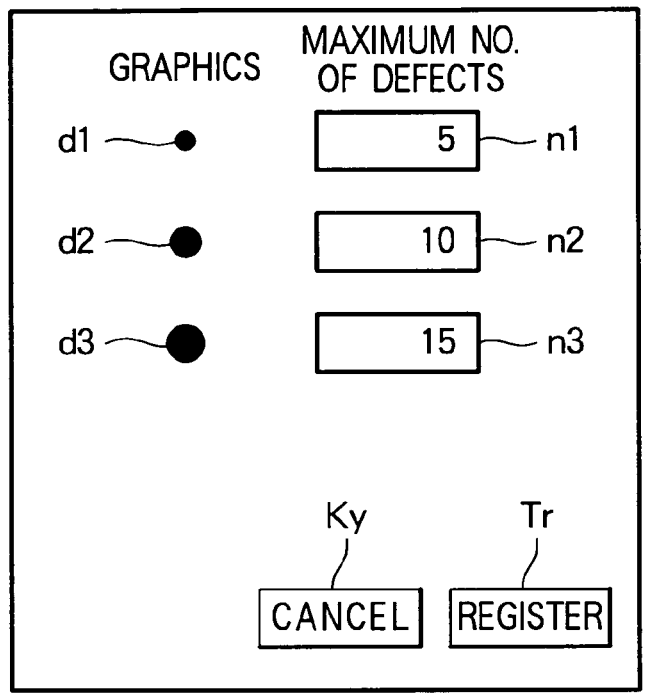
FIG. 10A and FIG. 10B are views illustrating the operation of a product quality information display system according to the present invention.
Figure 10B:
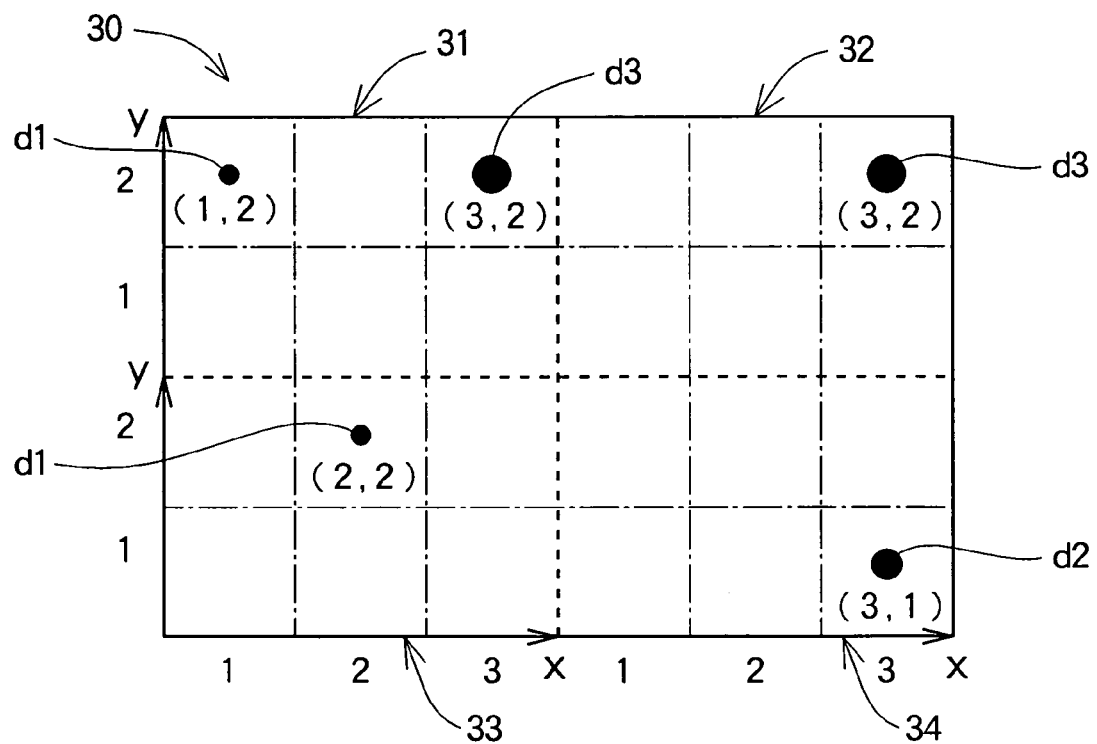

FIGS. 10A and 10B illustrate an operation of the product quality information display system.

In FIG. 10A, for adding up applicable imperfections in each position and consulting them, graphics d1, d2, and d3 (dots in this example) are firstly made d1, d2 and d3 which vary in size depending on the size of the number of applicable imperfections in each place.

For example, on the screen of the display device 15 (see FIG. 3), a maximum number of inputting sections or boxes n1, n2, n3 may be provided for inputting respective maximum numbers of applicable imperfections. In the uppermost box n1, 5 (number in a range of 1–5) is inputted. Inputted in the middle box n2 is 10 (number in a range of 6–10). In the lowest box n3, 15 (number in a range of 11–15) is inputted. These maximum number inputting sections n1, n2, n3 are displayed in correspondence with the dots d1, d2, d3.

Reference character Tr designates a register key for entering into the storage device 13 (see FIG. 3) the maximum numbers after inputting thereof. Reference character Ky designates a cancel key for canceling the maximum numbers inputted into the maximum number inputting sections n1, n2, n3.

As the floor mat described in relation to FIG. 6 is taken as an example, aggregation of applicable imperfections per coordinate of each area registered in the database produces the results as shown in FIG. 10B. As can be readily appreciated from this figure, the part 30 has a dot d1 plotted in the coordinates (1, 2) of an area 31, a dot d3 plotted in the coordinates (3, 2) of an area 31, a dot d3 plotted in the coordinates (3, 2) of an area 32, a dot d1 plotted in the coordinates (2, 2) of an area 33 and a dot d2 plotted in the coordinates (3, 1) of an area 34.

In this example, many applicable imperfections are present in the coordinates (3, 2) of the area 31 and the coordinates (3, 2) of the area 32 while fewer applicable imperfections exist in the areas 33, 34.

Although the applicable imperfections have been aggregated per coordinate in the above example, it may also be possible to display on the product image applicable imperfections aggregated per event of imperfection.

By selecting via the image position pointing device 12 (see FIG. 4) the displayed dots d1, d1, d2, d3, d3 or the graphics displayed per event, imperfection information corresponding to the dots d1, d1, d2, d3, d3 and graphics are displayed on the display device 15 (see FIG. 4). This enable easy access to desired imperfection information corresponding to the dots and graphics.

Since applicable positions (applicable coordinates) in imperfection areas can be selected visually as explained above, it becomes possible to perform an imperfection information inputting operation easily and quickly. It also becomes possible to grasp without delay the state of occurrence of imperfections per coordinate or event and hence to quickly take an appropriate measure, because graphics in correspondence with the number of applicable imperfections per coordinate or event are displayed. In addition, it becomes possible to obtain a large amount of imperfection information at one time. Moreover, since grasp of coordinates and events with many imperfections is enabled, effective and efficient measures can be worked out by sufficiently studying the imperfections in the coordinates and events.

Reference is now made to FIG. 11 which is a flowchart of a product quality information display method employed in the display system of FIG. 4. The display method comprises the following steps:

Step (hereinafter ST) 01: a product image is displayed;

ST02: an area in which an imperfection occurred is specified on a product image and then applicable area and part names are displayed;

ST03: imperfection information is inputted and then stored in correspondence with a specified imperfection coordinate;

ST 04: imperfections are counted per coordinate and graphics are produced in correspondence with the number of imperfections;

ST05: the graphics are displayed in applicable coordinates on the product image; and ST 06: by selecting the graphics, applicable imperfection information is displayed.

Figure 12:
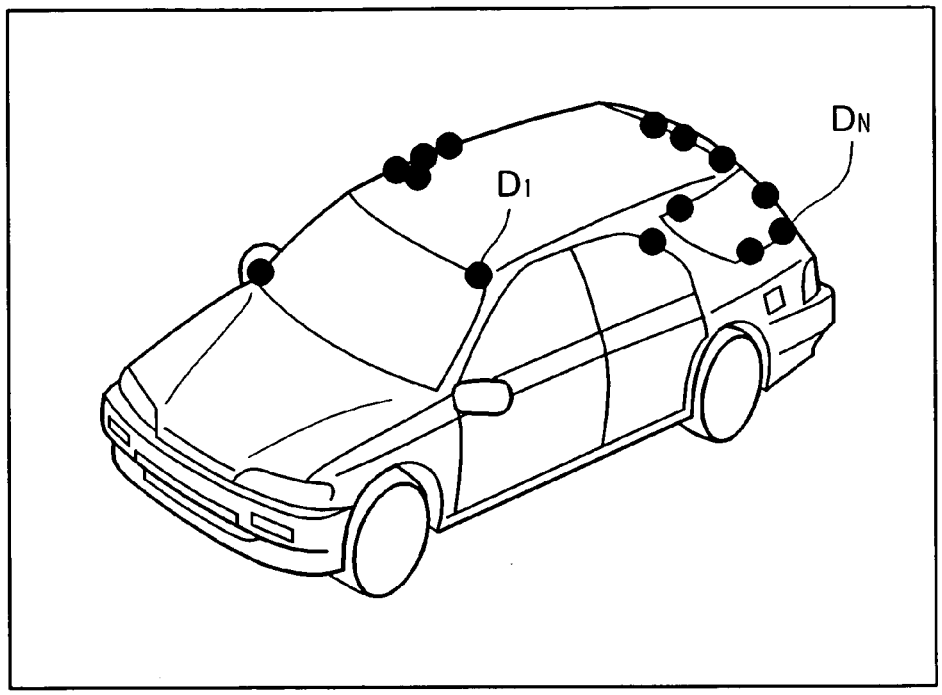
FIG. 12 is a view of a screen showing an aggregate of imperfection positions inputted into a graphic screen frame.

Referring now to FIG. 12, there are shown dots $D_1$–$D_n$ resulting from aggregating x-y-z coordinate data of imperfection examples formed based on respective imperfection information $J_F$ of FIG. 8. This makes it possible to efficiently grasp distributions of positions of occurrence of imperfection events and imperfection contents.

In the present product quality information display system, since the repair information contains graphic and character information corresponding to the contents of the repair made by the repair person and is fed back to a responsible manufacture control department, the manufacture control department can grasp accurately the imperfection which occurred at the inspection department and the temporary measure taken. This also makes it possible to instantly share the perpetual measure so that it is reflected upon the manufacture of the products.

Additionally, it becomes possible to display as the measure information $J_T$ the position of imperfection before and after a measure is taken to remedy the imperfection. The method can also be used upon starting the manufacture of products of a similar model.

Figure 13:
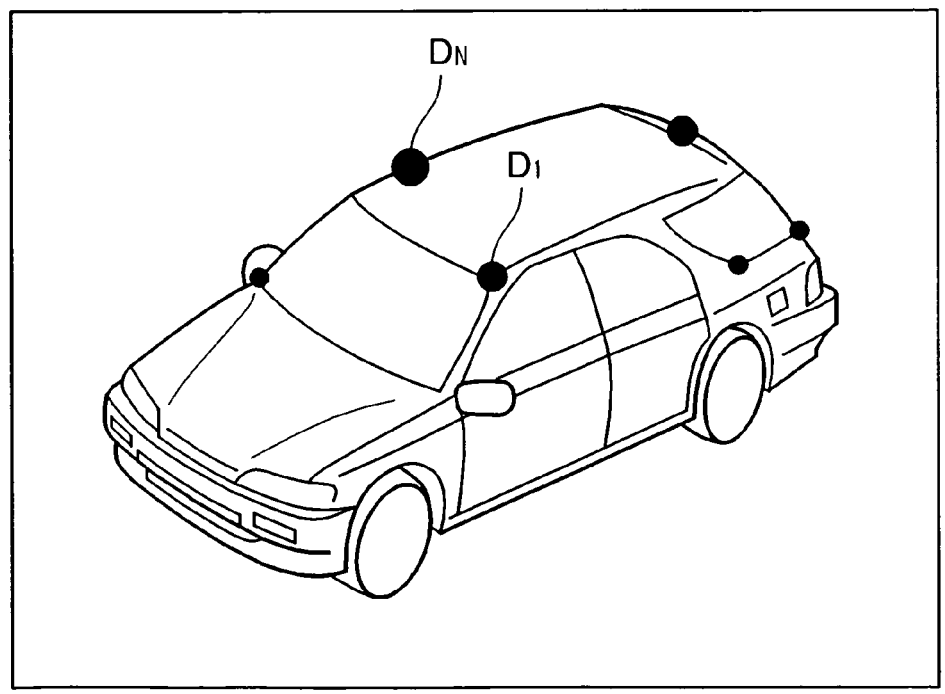
FIG. 13 is a view of a screen similar to that of FIG. 12 but showing another example of such aggregate.

FIG. 13 shows another exemplary screen of the product quality information display method. In this figure, there are shown dots $D_1$–$D_n$ plotted on the three-dimensional product image such that they change in size depending on the number of applicable imperfections per coordinate. This resulted from adding up applicable imperfections per position data g produced in the graphic picture frame G shown in FIG. 8.

Obviously, various minor changes and modifications of the present invention are possible in the light of the above teaching. It is therefore to be understood that within the scope of the appended claims the invention may be practiced otherwise than as specifically described.

What is claimed is:

1. A product quality information control method for stabilizing the quality of products while being produced in a production system having a plurality of manufacture control departments, a corresponding number of manufacturing lines and a single inspection department disposed downstream of the manufacturing lines, said method comprising:

a first step of inputting at the inspection department, information of imperfections found in the products during an inspection process of the products carried out at the inspection department;

a second step of making a repair at the inspection department based on said imperfection information and feeding repair information from the inspection department back to a responsible one of the manufacture control departments, said repair information containing graphic and character information representative of contents of the repair, said second step further comprises:

a first sub-step of selecting said imperfection information;

a second sub-step of making a repair based on said imperfection information and inputting a cause of the imperfection and contents of the repair;

a third sub-step of inputting processed graphic information and character information and further inputting coordinated position data of specific area relevant to the repair to a product image displayed on an input screen of a display; and a fourth sub-step of feeding said repair information of said second and third sub-steps back to said responsible manufacture control department; and a third step of producing at the responsible manufacture control department on the basis of said repair information, measure information to be reflected upon the manufacture of the products carried out at a corresponding one of the manufacturing lines;

said first, second and third steps being carried out on a real time basis.

2. A product quality information control method according to claim 1, wherein said third step includes inputting, as measure information, pre- and post-remedy information in the form of graphics.

3. The product quality information control method of claim 1 including a pre-step of pre-storing as a database a product image and names of parts in corresponding areas of the product image in a storage device and displaying the product image on a display;

wherein the third sub-step of the second step includes specifying the specific area on said product image displayed on said display by an image position pointing device and displaying on said display names of parts applicable to the specified area; and inputting specific imperfection information by a character information inputting device and storing in said storage device said specific imperfection information in correspondence with a coordinate of said specified area; and wherein the fourth sub-step of the second step includes counting applicable imperfections in each said coordinate of said specified area of the product image displayed on said display and producing graphics varying in size with the numbers of the counted imperfections;

displaying said produced graphics on an applicable said coordinate of said product image on said display; and displaying applicable information on said display by selecting the produced graphics by using said image position pointing device.

4. A product quality information display system for carrying out the method of claim 3, said system comprising:

the display having a screen;

the character information inputting device for inputting characters and numerals;

the image position pointing device for pointing to the position of an image on the screen of said display;

the storage device for storing character information from said character information inputting device and image position information from said image position pointing device and saving specific imperfection information as a database; and a graphic processor for counting the number of applicable pieces of the specific imperfection information about each area of the image stored in said storage device, per coordinate of the area or per event thereof, and producing graphics varying in size with the number of the counted applicable information pieces, said display displaying the produced graphics and said character and graphic information together with the image on the screen.

* * * * *